US011161948B2

(12) United States Patent
Backfolk et al.

(10) Patent No.: US 11,161,948 B2
(45) Date of Patent: Nov. 2, 2021

(54) FILM COMPRISING MICROFIBRILLATED CELLULOSE AND PRODUCTS MADE THEREFROM

(71) Applicant: Stora Enso OYJ, Helsinki (FI)

(72) Inventors: Kaj Backfolk, Villmanstrand (FI); Isto Heiskanen, Imatra (FI); Esa Saukkonen, Lappeenranta (FI); Jukka Kankkunen, Imatra (FI)

(73) Assignee: Stora Enso OYJ, Helsinki (FI)

( * ) Notice: Subject to any disclaimer, the term of this patent is extended or adjusted under 35 U.S.C. 154(b) by 489 days.

(21) Appl. No.: 16/096,800

(22) PCT Filed: Apr. 26, 2017

(86) PCT No.: PCT/IB2017/052390
§ 371 (c)(1),
(2) Date: Oct. 26, 2018

(87) PCT Pub. No.: WO2017/187350
PCT Pub. Date: Nov. 2, 2017

(65) Prior Publication Data
US 2020/0325287 A1 Oct. 15, 2020

(30) Foreign Application Priority Data

Apr. 29, 2016 (SE) .................... 1650589-3

(51) Int. Cl.
*C08J 5/18* (2006.01)
*B65D 81/20* (2006.01)

(52) U.S. Cl.
CPC ............ *C08J 5/18* (2013.01); *B65D 81/2084* (2013.01); *C08J 2301/02* (2013.01)

(58) Field of Classification Search
CPC ...... C08J 5/18; C08J 2301/02; B65D 81/2084
USPC ........................................................ 428/532
See application file for complete search history.

(56) References Cited

U.S. PATENT DOCUMENTS 10,328,666 B2 * 6/2019 Nyman ................... B32B 27/10
2014/0234640 A1 * 8/2014 Kohno ..................... G02B 1/14
428/452

FOREIGN PATENT DOCUMENTS

| EP | 1936032 | | 6/2008 | | |
|---|---|---|---|---|---|
| EP | 2371892 | A1 | 10/2011 | | |
| JP | 05237267 | A * | 9/1993 | | |
| JP | H05237267 | A | 9/1993 | | |
| JP | 2014223737 | A | 12/2014 | | |
| WO | 201 1056130 | | 5/2011 | | |
| WO | WO-2015181281 | A1 * | 12/2015 | ............. | B32B 15/08 |

OTHER PUBLICATIONS

Rodionova et al. "The formation and characterization of sustainable layered films incorporating microfibrillated cellulose", Bioresources, 2012, vol. 7 (issue 3), pp. 3690-3700. (Year: 2012).*
Spence et al. Water vapor barrier properties of coated and filled microfibrillated cellulose composite films, Bioresources, 2011, vol. 6, No. 4, pp. 4370-4388. (Year: 2011).*
International Search Report and Written Opinion for PCT/IB2017/052390, dated Dec. 22, 2017.
Third Party Observation submitted for PCT/IB2017/052390, Aug. 6, 2018.
Spence, K.L. et al. "Water vapor barrier properties of coated and filled microfibrillated cellulose composite films", Bioresources, 2011, vol. 6, No. 4, pp. 4370-4388.
Aulin, C. et al. "Multilayered alkyd resin/nanocellulose coatings for use in renewable packaging solutions with a high level of moisture resistance", Ind. Eng. Chem. Res., 2013, vol. 52, No. 7, pp. 2582-2589.
Hult, E. L. et al. "Efficient approach to high barrier packaging using microfibrillar cellulose and shellac", Cellulose, 2010, vol. 17, pp. 575-586.

* cited by examiner

*Primary Examiner* — Michael M. Bernshteyn
(74) *Attorney, Agent, or Firm* — Greer, Burns & Crain, Ltd.

(57) ABSTRACT

The present invention is directed to a film comprising a base film which has been coated on at least one side with a coating that enhances gas and/or moisture barrier properties, wherein the base film comprises a fiber material and at least 60% by weight of said fiber material is microfibrillated cellulose, and the thickness of the coating is from 0.05 to 20 µm. The invention is also directed to products using said film. Such products are in particular packages suitable for sensitive objects that need to be packaged in a controlled or modified atmosphere. The film is also useful for other purposes, such as in the manufacture of balloons.

10 Claims, No Drawings

FILM COMPRISING MICROFIBRILLATED CELLULOSE AND PRODUCTS MADE THEREFROM

This application is a U.S. National Phase under 35 U.S.C. § 371 of International Application No. PCT/IB2017/052390, filed Apr. 26, 2017, which claims priority under 35 U.S.C. §§ 119 and 365 to Swedish Application No. 1650589-3, filed Apr. 29, 2016.

TECHNICAL FIELD

The present invention is directed to a film comprising a base film which has been coated on at least one side with a coating that enhances gas and/or moisture barrier properties, wherein the base film comprises a fiber material and at least 60% by weight of said fiber material is microfibrillated cellulose, and the thickness of the coating is from 0.05 to 20 µm. The invention is also directed to products using said film. Such products are in particular packages suitable for sensitive objects that need to be packaged in a controlled or modified atmosphere. The film is also useful for other purposes, such as in the manufacture of balloons.

BACKGROUND

Packages used for sensitive objects such as food, where a certain composition of the atmosphere needs to be maintained inside the package, are referred to as modified atmosphere packages (MAP) or controlled atmosphere packages (CAP).

Films used in MAP and CAP are usually made from non-renewable plastic materials.

To manufacture a renewable film suitable for use in MAP and/or CAP, several technical problems need to be addressed. Firstly, the gas and moisture permeability of the package needs to be sufficiently low to make the film suitable for use in MAP and CAP. Secondly, the film needs to be sufficiently thin and flexible, heat sealable and gluable as well as biodegradable. It is also desirable that the printability properties are similar to that of paper. Ideally, the film should also be sufficiently resistant to heat.

Balloons are typically manufactured from non-renewable plastic or rubber materials.

To manufacture a balloon from a renewable material, several technical problems need to be addressed. In particular, the material from which the balloon is manufactured must be sufficiently strong to withstand the forces arising when the balloon is inflated and keep the inflated pressure for a sufficiently long time. Moreover, the material must be sufficiently light as well as biodegradable.

GB2448984 describes a multilayer polymeric film comprising a layer of lactic acid homo-polymer (PLA), a layer of polyvinyl alcohol (PVA, PVOH), at least one intermediate adhesive layer comprising a blend of poly(lactic acid) with poly(vinyl alcohol) and/or starch. The PVA may have a layer of PLA or cellulosic material applied to it. The multilayer film can be used as a package of fresh produce in a controlled atmosphere.

JP5237267 discloses a paper balloon made of cellulose fiber paper, which can continuously fly on air and which can be decomposed after it lands on the ground.

There is a need for a renewable material suitable for use as a film in a MAP and CAP.

Balloons made from paper will generally not keep the inflated pressure for a sufficiently long time because of high gas permeability of the paper material.

SUMMARY OF THE INVENTION

It has surprisingly been found that by using microfibrillated cellulose in the manufacture of a base film which is coated, it is possible to achieve a film suitable for use in a MAP and/or CAP that overcomes one or several of the problems described above. In addition, it has been found that the film is also suitable for the manufacture of balloons.

It is thus an object of the present disclosure to provide an improved film suitable for use in the manufacture of a MAP and/or CAP as well as in the manufacture of balloons.

One embodiment of the present invention is a film comprising a base film which has been coated on at least one side with a coating that enhances gas and/or moisture barrier properties, wherein the base film comprises a fiber material and at least 60% by weight of said fiber material is microfibrillated cellulose, and the thickness of the coating is from 0.05 to 20 µm, per side of base film. The base film comprises a fiber material and at least 60% by weight of said fiber material is microfibrillated cellulose. In one embodiment of the present invention, the remaining fiber material has a length-weighted fiber length average value of 0.2-0.55 mm, more preferably 0.3-0.45 mm.

In one embodiment, more than 80% of the coating applied has not penetrated deeper than 5 µm into the base film. Generally, the base film is sufficiently non-porous or non-permeable to ensure that the penetration is within this range.

In one embodiment, said film is not part of a laminate.

In one embodiment, the coating has been carried out with a varnish which is UV (ultraviolet) or EB (electron beam) curable.

In one embodiment, the coating has been carried out with a water-based varnish. Examples of water-based varnishes include colloidal emulsions such as styrene/butadiene, stryrene/acrylate latexes, water soluble polymers or mixtures of macromolecules and colloids. The varnishes may also comprise additivies such as cross-linkers or film forming agents. Preferred coating materials include ethylene copolymers, acrylic polymers and copolymers, copolymers of styrene and butadiene, vinyl acetate polymers, polyvinyl alcohol, polylactic acid, poly-ethylene vinyl acetate, polyethylene vinyl chloride, polyvinylidene chloride and mixtures of the aforementioned.

In one embodiment, the coating has been applied by printing.

In one embodiment, both sides of the base film have been coated.

One embodiment of the present invention is a modified atmosphere package or controlled atmosphere package comprising a film according to the present invention. In one embodiment of the present invention, the film is sealable, such as heat sealable. In one embodiment of the present invention, the film is gluable.

One embodiment of the present invention is a balloon comprising a film according to the present invention. The balloon is suitable for being inflated with helium, but can also advantageously be inflated with air or other typical gas mixtures used in MAP and/or CAP. In one embodiment of the present invention, the weight of the film is sufficiently low that the balloon, when filled with helium, can overcome gravity for at least 24 hours. The volume of the balloon, when inflated, is typically 5-50 liters. In one embodiment, the balloon is not inflated, but provided with e.g. a candle on the inside of the balloon. In that embodiment, the inside of the balloon may be coated with a non-flammable coating.

In one embodiment of the present invention, the oxygen transmission rate (OTR) of the film is less than 100 cc/m²*day, preferably less than 10 cc/m²*day measured at standard conditions (50% RH, 23° C.), at a grammage of 10-50 gsm. In one embodiment of the present invention, the oxygen transmission rate (OTR) of the film is less than 200 cc/m²*day measured at 70% RH, 37° C.), at a grammage of 10-50 gsm.

One embodiment of the present invention is a film comprising a base film which has been coated. The base film is a thin sheet, mouldable film or web. It comprises a high amount of microfibrillated cellulose and may or may not be laminated to form a multilayered structure. In a preferred embodiment of the present invention, the film is a free standing film or pouch, i.e. it does not form part of a laminate.

The base film may be transparent or translucent. The OTR (oxygen transmission rate) value (measured at standard conditions) of the base film is <200 cc/m2*day measured at 50% RH, 23° C., preferably <50, more preferably <30 or <25 and most preferably <5 at a grammage of 10-50 gsm. The thickness of the base film can be selected dependent on the required properties. In a preferred embodiment, base film thickness may for example be 10-100 µm, such as 20-60 or 10-50 µm, having a grammage of for example 5-50 gsm, such as 10-30 gsm.

The base film is provided with a thin coating on at least one side. The coating is preferably curable with UV (ultraviolet) or EB (electron beam) radiation curing using methods known in the art. The base film may also be treated by corona treatment and/or flame treatment. The thickness of the coating is 0.05-20 µm, preferably 0.1-10 µm or 0.1-5 µm or 0.1-3 µm. In one embodiment of the present invention, the coating is carried out with a varnish, resin or a wax.

In one embodiment, the coating is carried out with a water-based varnish. The coating can be applied by techniques known in the art such as foam coating, spray coating, curtain coating etc.

In one embodiment, the coating is a water-based varnish that is UV-curable or EB (electron beam) curable.

The base film or film according to the present invention can be subjected to printing before or after coating. In addition, the coating can be provided by printing. The base film has mechanical properties such that it is suitable for use in a reel to reel printing process, but can also be subjected to off-line surface treatment with other technologies such as flexogravure, rotogravure, reverse rotogravure, silk screen printing, inkjet printing, offset printing (lithography), spray, curtain, foam or other printing or surface treatment techniques.

In one embodiment of the present invention, the film is biodegradable and/or compostable. In this context, compostability is defined in accordance with ISO 18606, i.e. constituents in the whole material which are present at concentrations of less than 1% do not need to demonstrate biodegradability. However, the sum of such constituents shall not exceed 5%. Biodegradability is defined as follows: the ultimate aerobic biodegradability shall be determined for the whole material or for each organic constituent which is present in the material at a concentration of more than 1% (by dry mass). Constituents present at levels between 1 to 10% shall be tested individually.

DETAILED DESCRIPTION

The microfibrillated cellulose used in the film according to the present invention can be prepared using methods known in the art.

In one embodiment of the present invention, the base film is formed in a paper making machine or according to a wet laid production method, by providing a suspension onto a wire and dewatering the web to form an intermediate thin substrate or said base film. A suspension comprising microfibrillated cellulose is provided to form said base film.

The microfibrillated cellulose content of the suspension may, according to one embodiment be in the range of from 60 to 99.9 weight-% based on the weight of solids of the suspension. In one embodiment, the microfibrillated cellulose content of the suspension may be in the range of 70 to 99 weight-%, in the range of 70 to 95 weight-%, or in the range of from 75 to 90 weight-%.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods.

The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides, Tappi J.*, March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 m²/g, such as from 1 to 200 m²/g or more preferably 50-200 m²/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size fibrils.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CMF) defining a cellulose nanofiber material containing multiple elementary fibrils with both crystalline and amorphous regions.

According to another embodiment, the suspension may comprise a mixture of different types of fibers, such as microfibrillated cellulose, and an amount of other types of fiber, such as kraft fibers, fines, reinforcement fibers, synthetic fibers, dissolving pulp, TMP or CTMP, PGW, etc.

The suspension may also comprise other process or functional additives, such as fillers, pigments, wet strength chemicals, dry strength chemicals, retention chemicals, cross-linkers, softeners or plasticizers, adhesion primers, wetting agents, biocides, optical dyes, fluorescent whitening agents, de-foaming chemicals, hydrophobizing chemicals such as AKD, ASA, waxes, resins etc. Additives can also be added using a size press.

The papermaking machine that may be used in the process according to the present invention may be any conventional type of machine known to the skilled person used for the production of paper, paperboard, tissue or similar products.

Subsequent to the wet web being placed onto the wire, it is dewatered to form an intermediate thin substrate or film.

The dewatering on wire may, according to one embodiment be performed by using known techniques with single wire or twin wire system, frictionless dewatering, membrane-assisted dewatering, vacuum- or ultrasound assisted dewatering, etc. After the wire section, the wet web is further dewatered and dried by mechanical pressing including shoe press, hot air, radiation drying, convection drying, etc. The film might also be dried or smoothened by soft or hard nip (or various combinations) calenders etc.

According to one embodiment the wet web is dewatered by vacuum, i.e. water, and other liquids, is sucked from the furnish when it is placed on the wire.

The film according to the present invention can be heated, for example in a conventional household oven. The film may contain additives that improve the resistance to heat. Further, the film may contain additives such as salts and/or metal oxides to improve the fire or flame resistance of the film, which may particularly useful when the film is used in the manufacture of a balloon.

In view of the above detailed description of the present invention, other modifications and variations will become apparent to those skilled in the art. However, it should be apparent that such other modifications and variations may be effected without departing from the spirit and scope of the invention.

The invention claimed is:

1. A film comprising:
a base film which has been coated on at least one side with a coating that enhances gas and/or moisture barrier properties,
wherein the base film comprises a fiber material and at least 60% by weight of said fiber material is microfibrillated cellulose,
wherein the thickness of the coating is from 0.05 to 20 µm, per side of the base film,
wherein the film is compostable, or biodegradable, or both,
wherein the film is heat sealable, and
wherein the coating comprises at least one component selected from a group consisting of: ethylene copolymers, acrylic polymers and copolymers, copolymers of styrene and butadiene, vinyl acetate polymers, polyvinyl alcohol, polylactic acid, poly-ethylene vinyl acetate, polyethylene vinyl chloride, polyvinylidene chloride, and mixtures thereof.

2. The film according to claim 1, wherein more than 80% of the coating applied has not penetrated deeper than 5 µm into the base film.

3. The film according to claim 1, wherein the film is not part of a laminate.

4. The film according to claim 1, wherein the coating has been carried out with a varnish which is UV or EB curable.

5. The film according to claim 1, wherein the coating has been carried out with a water-based varnish.

6. The film according to claim 1, wherein the coating has been applied by printing.

7. The film according to claim 1, wherein both sides of the base film have been coated.

8. The film according to claim 1, wherein the thickness of the coating is from 0.05 to 10 µm, per side of the base film.

9. A modified atmosphere package or controlled atmosphere package comprising:
the film according to claim 1.

10. A balloon comprising:
the film according to claim 1.

* * * * *